J. GODDARD.
ROLL HOLDING CAMERA.
APPLICATION FILED SEPT. 16, 1915.
1,184,946.
Patented May 30, 1916.
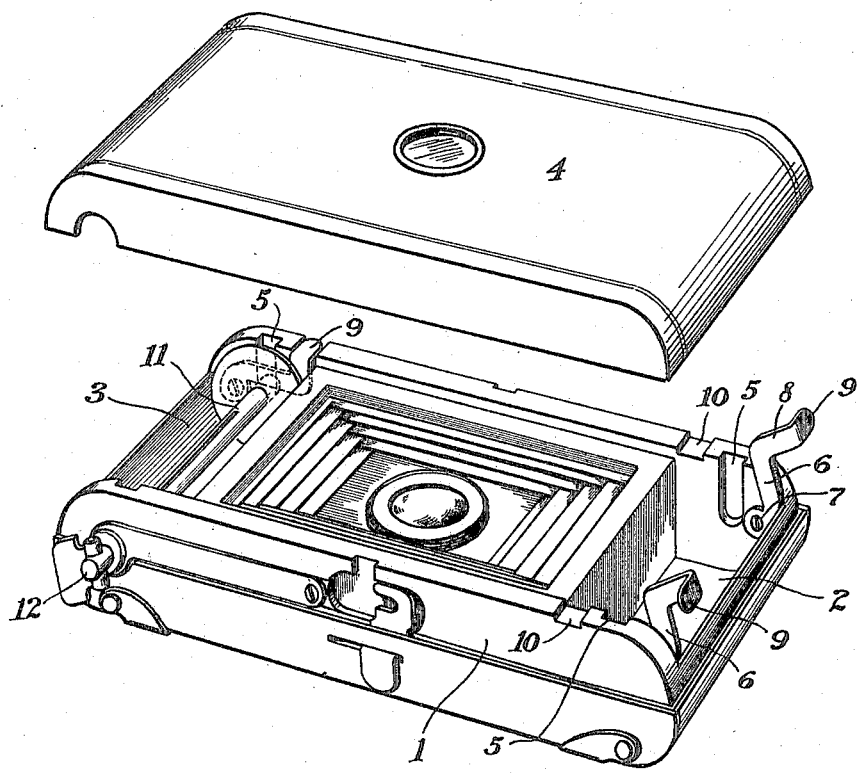
Inventor:
Joseph Goddard
by his attorneys
Davis & Dorsey

UNITED STATES PATENT OFFICE.

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

ROLL-HOLDING CAMERA.

1,184,946.        Specification of Letters Patent.      Patented May 30, 1916.

Application filed September 16, 1915. Serial No. 51,117.

*To all whom it may concern:*

Be it known that I, JOSEPH GODDARD, a citizen of the United States, and resident of Rochester, in the county of Monroe and State of New York, have invented certain new and useful Improvements in Roll-Holding Cameras, of which the following is a specification.

This invention relates to the means by which the film-reels are retained within the roll-holders of a photographic camera.

The object of the invention is to provide simple and convenient means for receiving and supporting, in operative position within the roll-holding compartments of a camera, the reels to and from which the film is wound, and particularly to provide means for this purpose which shall be concealed within the casing of the camera, when the casing is in its normal closed condition.

To the foregoing ends I provide the roll-holders, or roll-holding compartments, with slots or guide-ways into which the ends of the spindles of the film-reels may be introduced laterally when the cover or back is removed from the camera-casing, and in order to retain the spindles in working position in these slots or guide-ways, and to provide bearings for engagement with the spindles, I employ members mounted within the roll-holders adjacent said slots, these members being movable into and out of a position in which they cross the slots so as to engage the spindles laterally and retain them in proper position in the slots.

In order to facilitate the operation of the retaining-devices they are provided, in the preferred embodiment of the invention, with portions which extend to points adjacent the edges of the side-walls of the roll-holder, where they may be conveniently manipulated; and as a simple and effective means for securing the retainers in their operative position, they are so formed as to be engaged and held against movement by the cover or back which normally closes the roll-holding compartments.

The accompanying drawing is a perspective view of a roll-holding camera embodying the present invention, with the back removed to show the interior construction.

The invention is illustrated as applied to, or embodied in, a roll-holding camera of a well known folding type, this camera having the usual casing 1 provided, at its ends, with roll-holding compartments 2 and 3. The back of the casing, including said compartments, is normally closed by a cover 4, which is removable therefrom to permit the introduction or removal of a film-roll.

To receive and retain the ends of the spindles of the film-reels, the side-walls of the casing are provided with slots or guide-ways 5, these slots extending from the outer edges of the side-walls so that the reels may be introduced laterally into the compartments. It has been previously proposed to employ such guide-ways for the same purpose, but this arrangement, as previously used, has had the disadvantage that the tension of the film-strip, when the camera is in use, acts to move the reels laterally, so that the edges of their flanges bear against the cover and thus produce friction tending to resist rotation of the reels in the film-winding operation. The present invention resides particularly in the means which are employed to prevent this action, and to cause the ends of the reel-spindles to act effectively as journals by which the reels are supported laterally against the tension of the film. To this end I employ arms 6 of sheet-metal, which are pivoted on screws 7 alongside the slots 5. These arms may be swung to the position occupied by those in the compartment 2, as shown in the drawing, in which position they do not interfere with the introduction or removal of a film-reel. After the reel has been introduced into the compartment, however, each arm may be swung downwardly, so that, as shown in the compartment 3 in the drawing, the arm crosses the slot and engages the reel-spindle 11, thus retaining it at the bottoms of the slot.

For convenience in manipulation of the arms 6 they are provided with lateral extensions 8, terminating in outwardly bent lugs 9. These lugs rest normally in notches 10 in the side-walls of the casing, so that they do not interfere with the proper seating of the cover 4, while at the same time they are in a convenient and accessible position for manipulation. The lugs 9, in addition to the function just described, serve, in coöperation with the cover 4, as means for retaining the arms 6 in operative position when the cover is in place on the casing, for it will be obvious that the cover then acts to retain the lugs 9 in the notches 10.

The compartment 2 is provided with a pair of retaining-devices as just described. The compartment 3 has only one of such devices, however, since one end of the reel in this compartment is engaged and supported by a winding-key 12. This key may be of any ordinary or suitable construction.

I claim:—

In a roll-holding camera, the combination of a camera casing provided with a roll-holder compartment having a side-wall which is notched at its edge and is slotted, on its inner surface, to receive the spindle of a film-reel introduced laterally into the roll-holder compartment; a retainer comprising an arm, which is pivoted to the inner face of the side-wall, alongside the slot, and which swings into and out of a position in which it crosses the slot, and a part extending to the edge of the side-wall and thence outwardly in said notch and manually operable to swing the arm on its pivot; and a cover coöperating with the side wall and the outwardly-extending portion and having a side flange which closes the outer end of the notch against the entrance of light.

JOSEPH GODDARD.

Copies of this patent may be obtained for five cents each, by addressing the "Commissioner of Patents, Washington, D. C."